United States Patent [19]

Morris et al.

[11] Patent Number: 5,194,574
[45] Date of Patent: Mar. 16, 1993

[54] THERMALLY STABLE POLYESTERS CONTAINING TRANS-4,4'-STILBENEDICARBOXYLIC ACID

[75] Inventors: John C. Morris; Winston J. Jackson, Jr., both of Kingsport, Tenn.

[73] Assignee: Eastman Kodak Company, Rochester, N.Y.

[21] Appl. No.: 787,360

[22] Filed: Nov. 4, 1991

[51] Int. Cl.$^5$ ............... C08G 63/52; C08G 63/02; C08G 63/54
[52] U.S. Cl. ................... 528/306; 528/272; 528/302; 528/303; 528/304
[58] Field of Search ............... 528/272, 302, 303, 304, 528/306

[56] References Cited

U.S. PATENT DOCUMENTS

| | | | |
|---|---|---|---|
| 3,030,335 | 4/1962 | Caldwell et al. | 528/298 |
| 3,317,466 | 5/1967 | Goldberg et al. | 528/298 |
| 4,414,382 | 11/1983 | Morris et al. | 528/302 |
| 4,459,402 | 7/1984 | Morris et al. | 528/298 |
| 4,526,822 | 7/1985 | Morris et al. | 428/35 |
| 4,728,720 | 3/1992 | Morris et al. | 528/306 |

FOREIGN PATENT DOCUMENTS

72348/74 7/1974 Japan .

OTHER PUBLICATIONS

Liquid Crystal Polymers (Jackson et al, 1989).

*Primary Examiner*—John Kight, III
*Assistant Examiner*—T. Mosley
*Attorney, Agent, or Firm*—Mark A. Montgomery; William P. Heath, Jr.

[57] ABSTRACT

Melt processable copolyesters having improved thermal stability are prepared from 1,4-butanediol, minor amounts of trans-4,4'-stilbenedicarboxylic acid and a dicarboxylic acid selected from terephthalic acid, isophthalic acid, and mixtures thereof.

22 Claims, No Drawings

THERMALLY STABLE POLYESTERS CONTAINING TRANS-4,4'-STILBENEDICARBOXYLIC ACID

FIELD OF THE INVENTION

The present invention relates to isotropic polyesters containing repeating units prepared from terephthalic acid and/or isophthalic acid and 1,4-butanediol and minor amounts of trans 4,4'-stilbene-dicarboxylic acid.

BACKGROUND OF THE INVENTION

U.S. Pat. No. 4,459,402 discloses copolyesters of 20–80 mol % trans 4,4'-stilbenedicarboxylic acid, 80–20 mol % terephthalic acid and/or 80–20 mol % 2,6-naphthalene-dicarboxylic acid and 100 mol % 1,4-butanediol having exceptionally high tensile strength. U.S. Pat. No. 4,414,382 discloses polyesters based on 90–55 mol % 2,6-naphthalenedicarboxylic acid, 10–45 mol % trans 4,4'-stilbenedicarboxylic acid, and 100 mol % ethylene glycol. U.S. Pat. No. 4,526,822 discloses a polyester of terephthalic acid and ethylene glycol modified with 10–40 mol % trans 4,4'-stilbenedicarboxylic acid.

Japanese Kokai 72348/74 discloses blends of poly(1,4-butylene terephthalate) and a polyester having an aromatic dicarboxylic acid content that has at least mol % trans 4,4'-stilbenedicarboxylic acid.

Heretofore, copolyesters prepared from 1,4-butanediol, minor amounts of trans 4,4'-stilbene dicarboxylic acid and one other dicarboxylic acid have not been known, particularly when the other dicarboxylic acid is selected from terephthalic acid, and isophthalic acid.

SUMMARY OF THE INVENTION

The present invention is directed to a copolyester having improved thermal stability comprising:
(A) acid repeating units from
  (1) a major portion of an acid component selected from terephthalic acid, isophthalic acid, and mixtures thereof, and
  (2) greater than 0 but less than 20 mol % acid component of trans-4,4'-stilbenedicarboxylic acid; and
(B) glycol repeating units from 1,4-butanediol, wherein the total mol % of acid repeating units and glycol repeating units are each 100 mol %; said copolyester having an inherent viscosity greater than 0.2, determined at 25° C. in 25/35/40 (wt./wt./wt.) phenol, tetrachloroethane/p-chlorophenol at a concentration of 0.1 g/100 mL.

DETAILED DESCRIPTION OF THE INVENTION

The copolyesters of the present invention are useful in molding plastics, fibers, and films and have unexpectedly improved thermal stability in the melt and are preferably isotropic. The polyesters of the present invention prepared from 1,4-butanediol, and terephthalic acid, and/or isophthalic acid have greatly enhanced melt stability when modified with minor amounts of trans-4,4'-stilbenedicarboxylic acid (SDA).

Minor amounts, i.e., as little as 5 mol % and below, of SDA component in the copolyester of the present invention decreases the thermal degradation rate constant compared to the unmodified homopolymer of terephthalic acid and 1,4-butanediol. At 260° C., as little as 5 mol % of SDA results in a copolyester with a thermal degradation rate constant about one half that of the unmodified homopolymer. Increasing the SDA content to 19 mol % reduces the thermal degradation rate constant of the resulting copolyester by almost two orders of magnitude compared to the unmodified homopolymer. However, increasing the SDA content to 20 mol % and above reduces the polymer melting point to an unacceptably low temperature less than 200° C. and at greater than 30 mol % SDA content, a thermotropic liquid crystalline phase begins to form which leads to anisotropic polymers.

The copolyesters of the present invention generally comprise (A) acid repeating units from (1) at least 80 mol % of an acid component selected from terephthalic acid and isophthalic acid, and (2) less than 20 mole % acid repeating units of trans-4,4'-stilbenedicarboxylic acid; and (B) glycol repeating units up to 100 mol % 1,4-butanediol.

The repeating units of the copolyesters of the present invention preferably comprise 81 to 96 mol % acid component (1), 4 to 19 mol % trans-4,4'-stilbenedicarboxylic acid and about 100 mol % 1,4-butanediol. The repeating units of the copolyesters of the present invention more preferably comprise 81 to 90 mol % acid component (1), 10 to 19 mol % trans-4,4'-stilbenedioarboxylic acid and 100 mol % 1,4 butanediol.

Copolyesters of the present invention can be prepared by conventional processes such as melt polymerization or by solid state polymerization of low molecular weight prepolymer which has been prepared in the melt or by a combination of these processes.

In the copolyester of the present invention, the acid repeating units of acid component (1) above can be substituted with up to 10 mol % of an additional aromatic dicarboxylic acid. Examples of suitable aromatic dicarboxylic acids include terephthalic acid, isophthalic acid, 4,4'-biphenyldicarboxylic acid. 1,5-, 2,6-, 2,7-Naphthalenedicarboxylic, or 4,4'-oxydibenzoic acid. It is preferred, however, that the dicarboxylic acid portion of acid component (1) be primarily terephthalic acid units.

The 1,4-butanediol, i.e., glycol portion of the copolyesters of the present invention can be substituted with up to 10 mol % of another glycol containing 2–16 carbon atoms. Examples of suitable glycols include 1,3-propanediol, neopentyl glycol, trans or cis-2,2,4,4-tetramethyl-1,3-cyclobutanediol, 1,5 pentanediol, 1,6-hexanediol, cis- or trans-1,4-cyclohexanedimethanol and p-xylene. These copolyesters can also be modified by the incorporation of units from polyethylene glycols or polytetramethylene glycols to enhance elastomeric behavior.

The copolyesters of the present invention preferably have an inherent viscosity of at least 0.3, determined at 25° C. in 25/35/40 (wt./wt./wt.) phenol/tetrachloroethane/p-chlorophenol at a concentration of 0.1 g/100 mL, more preferably at least 0.6 or more. The copolyesters of the present invention also preferably have a degradation rate constant less than $3.0 \times 10^{-4}$ at 260° C.

The copolyesters of the present invention oan be further modified by the incorporation of blend modifiers. This composition can comprise:
(i) about 95 to 5 weight percent of the copolyester and
(ii) about 5 to 95 weight percent of at least one property modifier.

Preferably (i) is present in an amount of about 90 to 10 weight percent, and (ii) is present in an amount of about 10 to 90 weight percent.

Examples of suitable blend or property modifiers include polyamides such as Nylon 6,6 from Du Pont, poly(ether imides) such as Ultem poly(ether imide) from General Electric, polyphenylene oxides, such as poly(2,6 dimethylphenylene oxide) or poly(phenylene oxide)/polystyrene blends such as the Noryl resins from General Electric, other polyesters, polyphenylene sulfides, polyphenylene sulfide/sulfones, poly(ester carbonates), polycarbonates such as Lexan polycarbonate from General Electric, polysulfones, polysulfone ethers, and poly(ether ketones) of aromatic dihydroxy compounds. Suitable dihydroxy compounds used to prepare these modified polyesters are disclosed in U.S. Pat. Nos. 3,030,335 and 3,317,466.

The copolyesters of the present invention can also contain conventional flame retardants, such as phosphorus or halogen compounds; fillers, such as talc, or mica; reinforcing agents such as glass fiber, Kevlar fiber from Du Pont, carbon fibers, and the like.

The following examples are to illustrate the present invention but should not be interpreted as a limitation thereof.

EXAMPLES

Example 1

This example is a comparative example illustrating the preparation of the homopolyester of 100 mol % terephthalic acid units and 100 mol % 1,4-butanediol units.

A mixture of 155.2 g (0.80 mol) dimethyl terephthalate and 144.0 g (1.60 mols) 1,4 butanediol (100 mol % excess) and 0.11 g titanium tetraisopropoxide was placed in a 1-liter flask equipped with an inlet for nitrogen, a metal stirrer, and a short distillation column. The flask was placed directly into a Wood's metal bath heated at 200° C. for 1.5 hr and then the temperature of the bath was raised to 270° C. for about 45 min. A vacuum of 0.5 mm was gradually applied over the next 5 to 10 minutes. Full vacuum was maintained for about 40–50 min. A high melt viscosity, crystalline polymer was obtained with an I.V. of 1.28 and a melting endotherm measured by DSC at 224° C.

The polymer was ground to pass a 3-mm screen, dried and the thermal degradation rate constant was determined to be $5.34 \times 10^{-4}$ at 260° C. and $22.2 \times 10^{-4}$ at 280° C.

Example 2

This example illustrates the preparation of the copolyester of 99 mol% terephthalic acid units, 1 mol% trans-4,4'-stilbenedicarboxylic acid units, and 100 mol% 1,4-butanediol units.

A mixture of 153.6 g (0.792 mol) dimethyl terephthalate, 2.4 g (0.008 mol) trans 4,4'- stilbenedicarboxylic acid, 144.0 g (1.60 mols) 1,4-butanediol (100 mol% excess), and 0.11 g titanium tetraisopropoxide was placed in a 1-liter flask equipped with an inlet for nitrogen, a metal stirrer, and a short distillation column. The flask was placed in a Wood's metal bath heated at 195° C. for 1 hr and then the temperature was raised to 270° C. for about 20 min. A vacuum of 0.5 mm was gradually applied over the next 5–10 minutes. Full vacuum was maintained for about 30–40 min. A high melt viscosity, crystalline polymer was obtained with an I.V. of 1.32 and a melting endotherm measured by DSC at 211° C.

The polymer was ground to pass a 3-mm screen, dried and the thermal degradation rate constant was determined to be $23.2 \times 10^{-4}$ at 280° C.

Example 3

This example illustrates the preparation of the copolyester of 95 mol % terephthalic acid units, 5 mol % trans 4,4'-stilbenedicarboxylic acid units, and 100 mol % 1,4-butanediol units. This example was prepared essentially according to Example 2 except that the monomer mixture contained 147.4 g (0.76 mol) dimethyl terephthalate, and 11.8 g (0.04 mol) trans 4,4'-stilbenedicarboxyic acid.

The thermal degradation rate constant is illustrated below in Table 1.

Example 4

This example illustrates the preparation of the copolyester of 90 mol % terephthalic acid units, 10 mol % trans 4,4'-stilbenedicarboxylic acid units, and 100 mol % 1,4-butanediol units. This example was prepared essentially according to Example 2 except that the monomer mixture contained 139.7 g (0.72 mol) dimethyl terephthalate, and 23.7 g (0.08 mol) trans 4,4'-stilbenedicarboxylic acid.

The thermal degradation rate constant is illustrated below in Table 1.

Example 5

This example illustrates the preparation of the copolyester of 81 mol % terephthalic acid units, 19 mol trans 4,4'-stilbenedicarboxylic acid units, and 100 mol % 1,4'-butanediol units. This example was prepared essentially according to Example 2 except that the monomer mixture contained 124.2 g (0.648 mol) dimethyl terephthalate, and 47.4 g (0.152 mol) trans-4,4'-stilbenedicarboxylic acid.

The thermal degradation rate constant is illustrated below in Table 1.

TABLE 1

Effect of trans-4,4'-Stilbenedicarboxylic Acid on the Thermal Degradation Rate Constant of Poly(1,4-butylene terephthalate)

| Example | SDA Content, Mol % | Thermal Degradation Rate Constant, $\times 10^{-4}$ @ 260° C. | @ 280° C. |
|---|---|---|---|
| 1 | 0 | 5.34 | 22.2 |
|   | 0 | — | 22.4 |
| 2 | 1 |   | 23.2 |
| 3 | 5 | — | 17.6 |
|   | 5 | 2.54 | — |
| 4 | 10 | 1.88 | 12.4 |
| 5 | 19 | 0.08 | 9.2 |

Example 6

This example is a comparative example illustrating the preparation of copolyesters having 30, 50, and 90 mol % trans-4,4'-stilbenedicarboxylic acid units. In this example, the copolyesters were prepared essentially according to Example 5 except that the amount of therephthalic acid units and trans-4,4'-stilbenedicarboxylic acid units were varied to result in the listed mol percents. The melting points of these polyesters and those of Example 1–5 are listed in Table 2 below along with the type of polyester.

TABLE 2

Melting Points of Polyesters of Terephthalic Acid and 1,4-Butanediol Modified with trans-4,4-Stilbenedicarboxylic Acid (SDA)

| SDA Content Mol % | Melting Point Tm. °C. (DSC) | |
|---|---|---|
| 0 | 224 | Isotropic |
| 5 | 217 | Isotropic |
| 10 | 211 | Isotropic |
| 19 | 202 | Isotropic |
| 30 | 199 | Isotropic |
| 50 | 212 | Anisotropic |
| 90 | 296 | Anisotropic |
| 100 | 317 | Anisotropic |

The examples in Tables 1 and 2 show that the polyester of terephthalic acid and 1,4-butanediol has greatly enhanced melt stability when modified with minor amounts of SDA. At 260° C., as little as 5 mol % of the SDA component results in a copolymer with a thermal degradation rate constant about one-half that of the unmodified homopolymer of terephthalic acid and 1,4-butanediol while maintaining a polymer melting point greater than 200° C. Increasing the SDA content to 19 mol % reduces the thermal degration rate constant of the resulting copolymer by almost two orders of magnitude compared to the unmodified homopolymer of terephthalic acid and 1,4-butanediol while maintaining a polymer melting point greater than 200° C. The data in column 3 of Table 1 further illustrates the ability of the SDA component to reduce the thermal degration rate constant at 280° C. by more than an order of magnitude compared to the unmodified homopolymer.

The invention has been described in detail with particular reference to preferred embodiments thereof, but it will be understood that variations and modifications can be effected within the spirit and scope of the invention.

We claim:

1. An isotropic copolyester having improved thermal stability comprising:
   (A) acid repeating units from
      (1) a major poriton of an acid component selected from the group consisting of terephthalic acid, isophthalic acid, and mixtures thereof, and
      (2) greater than zero but less than 20 mol % acid component of trans-4,4'-stilbenedicarboxylic acid; and
   (B) glycol repeating units of at least 90 mol % 1,4-butanediol,
   wherein the total mol % of acid repeating units and glycol repeating units are each 100 mol %; said isotropic copolyester having an inherent viscosity greater than 0.2, determined at 25° C. in 25/35/40 (wt./wt./wt.) phenol, tetrachloroethane/p-chlorophenol at a concentration of 0.1 g/100 mL and a melting point of at least 200° C.

2. The copolyester of claim 1 wherein the acid repeating units from acid component (1) are present in the amount of 81 to 96 mol % and the acid repeating units from trans-4,4,'-stilbenedicarboxylic acid are present in the amount of 4 to 19 mol %.

3. The copolyester of claim 2 wherein the acid repeating units from acid component (1) are present in the amount 81 and 90 mol % and the repeating units from trans-4,4'-stilbenedicarboxylic acid are present in the amount of 10 to 19 mol %.

4. The copolyester of claim 1 wherein the glycol repeating units from 1,4-butanediol are present in the amount of about 100 mol %.

5. The copolyester of claim 1 wherein said acid repeating units are from acid component (1), trans 4,4'-stilbenedicarboxylic acid, and up to 10 mol % of at least one other aromatic dicarboxylic acid.

6. The copolyester of claim 5 wherein said other aromatic dicarboxylic acid is selected from the group consisting of terephthalic acid, isophthalic acid, 4,4'-biphenyldicarboxylic, 1,5-, 1,6-, 2,7-naphthalenedicarboxylic, and 4,4'-oxydibenzoic acid.

7. The copolyester of claim 1 wherein said glycol repeating units are from 1,4-butanediol and up to 10 mol of at least one other glycol having 2 to 16 carbon atoms.

8. The copolyester of claim 7 wherein said other glycol is selected from the group consisting of 1,3-propanediol, neopentyl glycol, cis-2,2,4,4 tetramethyl-1,3-cyclobutanediol, trans-2,2,4,4-tetramethyl-1,3-cyclobutanediol, 1,5-pentanediol, 1,6-hexanediol, cis-1,4-cyclohexanedimethanol, trans-1,4-cyclohexanedimethanol, p-xylene glycol, polyethylene glycols, and polytetramethylene glycols.

9. The copolyester of claim 1 wherein acid component (1) is terephthalic acid.

10. The copolyester of claim 9 wherein the copolyester is isotropic and has a melting point greater than 200° C.

11. A composition comprising:
    (i) about 95 to 5 weight percent of the polyester of claim 1, and
    (ii) about 5 to 95 weight percent of at least one property modifier.

12. The composition according to claim 11 wherein (i) is present in an amount of about 90 to 10 weight percent, and (ii) is present in an amount of about 10 to 90 weight percent.

13. The composition according to claim 11 wherein the property modifier is selected from the group consisting of Nylon 6,6, poly(ether imides), polyphenylene oxides, poly(phenylene oxide)/polystyrene blends, other polyesters, polyphenylene sulfides, polyphenylene sulfide/sulfones, poly(ester carbonates), polycarbonates, polysulfones, polysulfone ethers, and poly(ether ketones) of aromatic dihydroxy compounds.

14. The composition according to claim 11 wherein the property modifier is selected from the group consisting of flame retardants, fillers, and reinforcing agents.

15. The composition according to claim 11 wherein the property modifier is selected from the group consisting of flame retardent phosphorus compounds, flame retardant halogen compounds, talc, mica, glass fibers, Kevlar fibers, and carbon fibers.

16. The composition according to claim 13 wherein (i) is the polyester of claim 9.

17. A fiber comprising the polyester of claim 1.

18. The fiber of claim 17 wherein the polyester is the polyester of claim 9.

19. A film comprising the polyester of claim 1.

20. The film of claim 19 wherein the polyester is the polyester of claim 9.

21. A molded object comprising the polyester of claim 1.

22. The molded object of claim 21 wherein the polyester is the polyester of claim 9.